United States Patent [19]

Nomura

[11] Patent Number: 4,471,855

[45] Date of Patent: Sep. 18, 1984

[54] CONTROL DEVICE FOR AN A.C. ELEVATOR

[75] Inventor: Masami Nomura, Nagoya, Japan

[73] Assignee: Mitsubishi Denki Kabushiki Kaisha, Tokyo, Japan

[21] Appl. No.: 403,873

[22] Filed: Jul. 30, 1982

[30] Foreign Application Priority Data

Aug. 4, 1981 [JP] Japan .................. 56-122113

[51] Int. Cl.³ ............................................. H02P 7/36
[52] U.S. Cl. .................. 187/29 R; 318/803; 363/69
[58] Field of Search ............ 187/29; 318/803, 807; 363/67, 69, 70

[56] References Cited

U.S. PATENT DOCUMENTS

| | | | |
|---|---|---|---|
| 4,019,116 | 4/1977 | Klautschek | 318/807 X |
| 4,208,709 | 6/1980 | Garnham et al. | 363/69 X |
| 4,209,082 | 6/1980 | Anzai et al. | 187/29 |
| 4,319,177 | 3/1982 | Kawada et al. | 318/803 X |
| 4,366,532 | 12/1982 | Rosa et al. | 363/69 |
| 4,379,325 | 4/1983 | Krampe et al. | 318/803 X |

Primary Examiner—J. V. Truhe
Assistant Examiner—W. E. Duncanson, Jr.
Attorney, Agent, or Firm—Wenderoth, Lind & Ponack

[57] ABSTRACT

This invention is designed to prevent the large charging current from flowing to the capacitor at the start of the elevator for preventing damage of the elements of the rectifier device. Thus the present device provides a control device for an a.c. elevator which includes:

a commercial a.c. source, a capacitor for smoothing the output voltage of the commercial a.c. source, an inverter for converting the smoothed output voltage of the capacitor into an a.c. power of the variable frequency, an a.c. motor for driving the elevator car by the a.c. power supplied from said inverter, and a rectifier for rectifying the voltage of the commercial a.c. source and charging said capacitor by the thus rectified voltage at least when the car is stopped.

4 Claims, 3 Drawing Figures

PRIOR ART FIG. 1
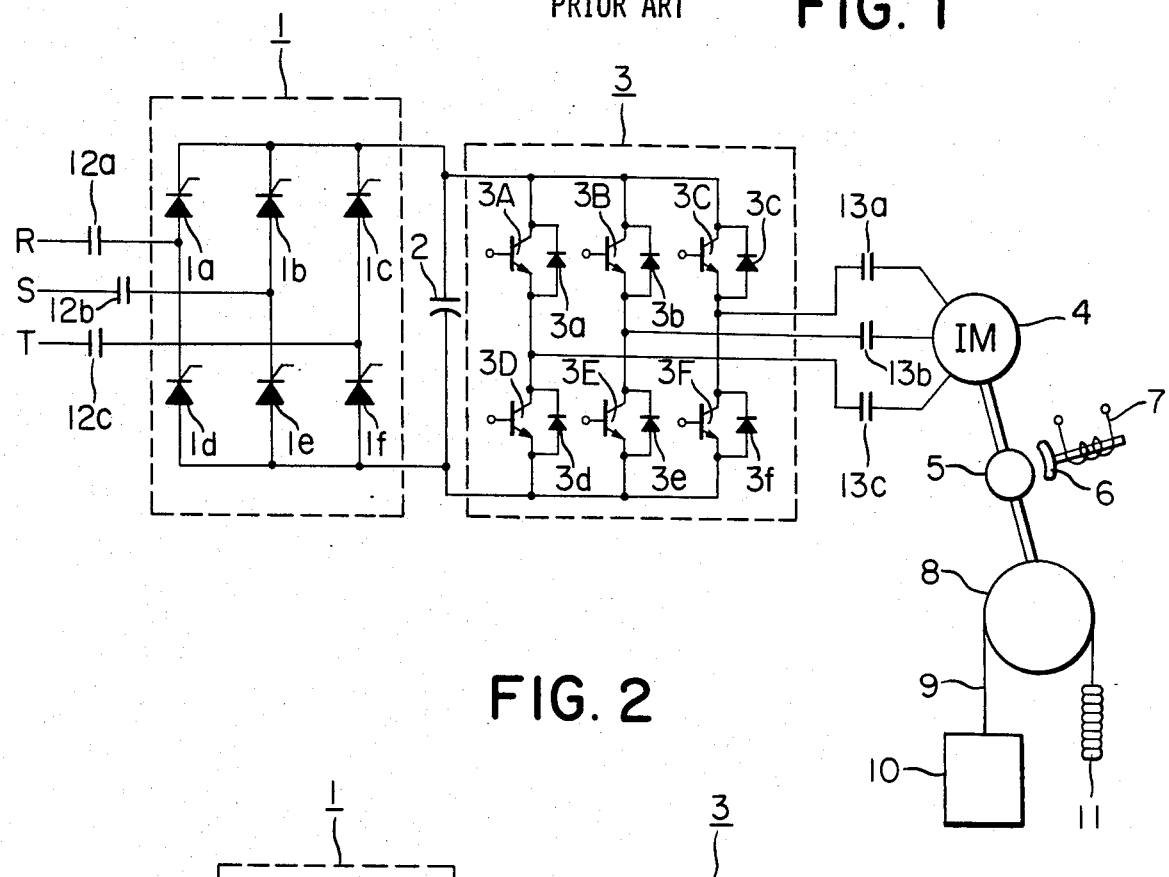
FIG. 2
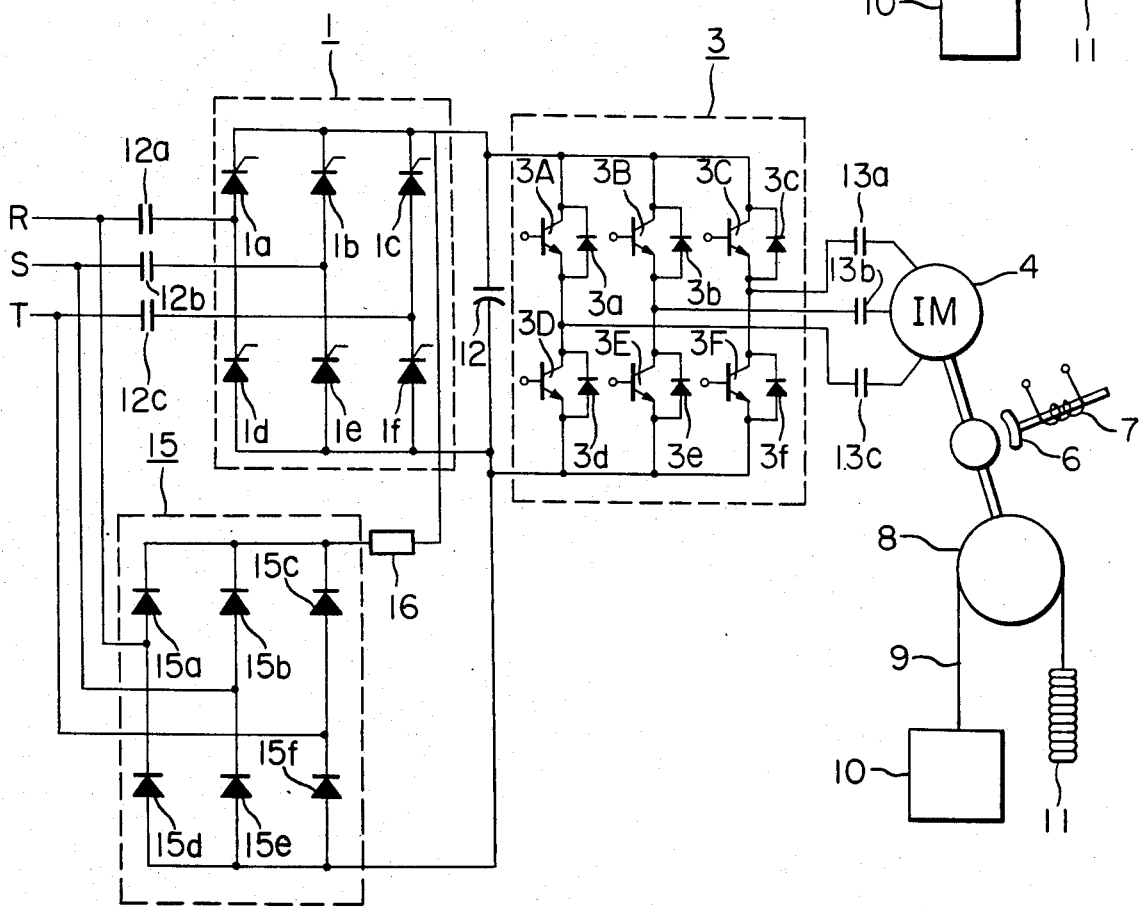

so that the motor 4 is disconnected from the source. The brake coil 7 is deenergized at the same time and the brake shoe 6 is pressured to the brake wheel 5 under the force of the aforementioned spring for braking the brake wheel 5. At this time, only the control elements of certain predetermined arms of the inverter 3 are rendered operative by the opening of the contacts 12a to 12c so that the charge of the capacitor 2 flows to the motor 4 for applying a d.c. braking torque to the motor 4. In this manner, the car 10 is stopped positively at the floor of destination.

However, when the thyristors are turned on with closure of the contacts 12a to 12c, a large charging current with quick build-up characteristics flows through the capacitor 2, thus occasionally damaging the thyristors 1a to 1f. Moreover, the service life of the capacitor 2 may be shortened where the start and stop operations are repeated frequently, as in the case of an elevator. Reactors or other current limiting devices may be connected to the direct current side of the rectifier device 1 for protecting the thyristors 1a to 1f and the capacitor 2 from such adverse effects. However, such control device tends to be costly.

SUMMARY OF THE INVENTION

It is a main object of the present invention to provide a control device for an a.c. elevator which is free from the above inconvenience and in which the large charging current may not flow to the capacitor at the time of starting of elevator operation.

It is another object of the present invention to prevent damage of rectifying elements of the rectifier device.

BRIEF DESCRIPTION OF THE DRAWINGS

FIG. 1 is a diagrammatic view showing a prior-art control device of the a.c. elevator.

FIG. 2 is a diagrammatic view showing an embodiment of the control device of the a.c. elevator according to the present invention.

DESCRIPTION OF THE PREFERRED EMBODIMENT

Figure 3:
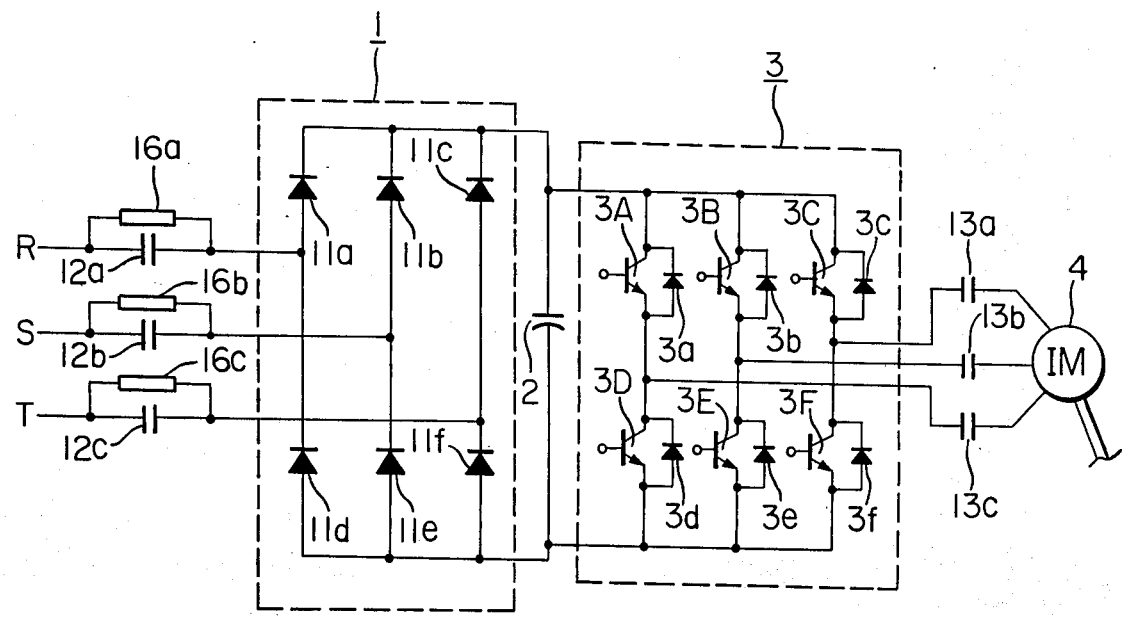
FIG. 3 is a diagrammatic view showing a modified embodiment of the present invention.

An embodiment of the present invention is described by referring to FIG. 2.

In the Figure, the numeral 15 designates a second rectifier device connected between the source R, S, T and the output side of the first rectifier device 1 and consisting of a group of diodes 15a to 15f connected for forming a three-phase full wave rectifier circuit. The numeral 16 designates an impedance consisting of a resistor connected to the output side of the rectifier 15. Other elements are the same as those shown in FIG. 1.

The capacitor 2 is charged by the rectifier device 15 and the impedance 16 even while the car 10 is at a standstill. Thus, when the contacts 12a to 12c have been closed at the start of elevator travel, the capacitor 2 is not charged suddenly by the direct current flowing through the lower impedance of the rectifier device 1. In this manner the thyristors and capacitors 2 may not be affected by the excessive charging current to the capacitor 2 when the elevator is started.

FIG. 3 illustrates a modified embodiment of the present invention.

In the Figure, the numeral 1 denotes a rectifier device wherein a group of diodes 11a to 11f are used in place of the thyristors 1a to 1f to the rectifier device shown in FIG. 1. The numerals 16a to 16c designate an impedance consisting of resistors connected across the contacts 12a to 12c. Other elements are the same as those shown in FIG. 1.

This embodiment refers to a form of a variable voltage and frequency generator with the rectifier device 1 being formed by a group of diodes 11a to 11f.

As is clear from the drawing, while the car is stopped, that is, when the contacts 12a to 12c are opened, the capacitor 2 is charged at all times through the impedance in the form of resistors which is connected in the alternating current side of the rectifier device. Accordingly, when the contacts 12a to 12f are closed at the start of elevator travel, discharge rush current does not flow to the capacitor 2, and hence the diodes 11a to 11f may not be damaged by the overcurrent flowing through the diodes.

As mentioned above, the present invention is directed to a control device for the a.c. elevator wherein the alternating current from the commercial a.c. source is rectified by the rectifier circuit, smoothed by the capacitor and converted by the inverter into the a.c. power of the variable frequency used for driving the elevator car. According to the present invention, the capacitor may be charged through the impedance connected to the commercial a.c. source while the elevator is stopped. In this manner, the large charging current may be prevented from flowing to the capacitor during startup of the car so that the rectifier elements of the rectifier device and the capacitor may not be damaged by overcurrent conditions.

What is claimed is:

1. A control device for an A.C. elevator comprising:
   a commercial A.C. voltage source;
   first means for rectifying an output voltage from said commercial A.C. source;
   a capacitor for smoothing the rectified output voltage of said commercial A.C. source;
   contacts provided between said commercial A.C. source and said capacitor, said contacts being closed when an elevator car is travelling and opened when said elevator car is stopped;
   an inverter for converting said smoothed rectified output voltage of said capacitor into an A.C. voltage having a variable frequency;
   an A.C. motor for driving said elevator car with said A.C. voltage supplied from said inverter; and
   a second means for rectifying said output voltage from said commercial A.C. voltage source and for charging said capacitor by the thus rectified voltage at least when said car is stopped, said second rectifying means being provided between said commercial A.C. source and said capacitor so as to bypass said contacts.

2. A control device for an A.C. elevator as claimed in claim 1, wherein said second rectifying means includes an impedance, and the thus rectified voltage is supplied through said impedance to said capacitor.

3. A control device for an A.C. elevator comprising:
   a commercial A.C. voltage source;
   a rectifying means for rectifying an output voltage from said commercial A.C. voltage source;
   a capacitor for smoothing the rectified output voltage of said commercial A.C. source;
   contacts provided between said commercial A.C. source and said capacitor, said contacts being closed when an elevator car is travelling and opened when said elevator car is stopped;
   an inverter for converting said smoothed rectified output voltage of said capacitor into an A.C. voltage having a variable frequency;
   an A.C. motor for driving said elevator car with said A.C. voltage supplied from said inverter; and
   an impedance, provided between said rectifying means and said commercial A.C. source so as to bypass said contacts, for charging said capacitor.

4. A control device for an A.C. elevator as claimed in claim 3, wherein said capacitor is charged by said commercial A.C. source through said impedance and said rectifying means when said contacts are opened.

* * * * *